(12) United States Patent
Lynch

(10) Patent No.: US 6,931,430 B1
(45) Date of Patent: Aug. 16, 2005

(54) MAINTAINING COHERENCY IN A SYMBIOTIC COMPUTING SYSTEM AND METHOD OF OPERATION THEREOF

(76) Inventor: Thomas W. Lynch, 4711 Spicewood Springs Rd., #229, Austin, TX (US) 78759

(*) Notice: Subject to any disclaimer, the term of this patent is extended or adjusted under 35 U.S.C. 154(b) by 0 days.

(21) Appl. No.: 09/310,508

(22) Filed: May 12, 1999

Related U.S. Application Data

(60) Provisional application No. 60/085,421, filed on May 13, 1998.

(51) Int. Cl.[7] .......................... G06F 15/16; G06F 12/00
(52) U.S. Cl. ........................... 709/205; 707/8; 711/141
(58) Field of Search ................................ 709/200–205; 707/200–206, 8, 1, 2, 3; 711/141

(56) References Cited

U.S. PATENT DOCUMENTS

| | | | | |
|---|---|---|---|---|
| 5,434,994 A | * | 7/1995 | Shaheen et al. ............ 709/231 |
| 5,557,792 A | * | 9/1996 | Josten et al. ................ 709/231 |
| 5,742,792 A | * | 4/1998 | Yanai et al. ................. 711/162 |
| 5,774,668 A | * | 6/1998 | Choquier et al. ........... 709/219 |
| 6,058,400 A | * | 5/2000 | Slaughter et al. ........... 707/201 |
| 6,301,582 B1 | * | 10/2001 | Johnson et al. ............. 707/103 |
| 6,341,339 B1 | * | 1/2002 | Kontothanassis et al. ... 711/148 |

\* cited by examiner

Primary Examiner—Beatriz Prieto

(74) Attorney, Agent, or Firm—Bruce Garlick

(57) ABSTRACT

A symbiotic computing system includes a plurality of symbiotic partners that are communicatively coupled with one another and each of which has a respective instance of a managed resource. One (or more) of the symbiotic partners receive input that affects a respective instance of the managed resource. Based upon the input, the symbiotic partner produces actions and transmits the actions to each other of the symbiotic partners. Upon receipt, each other of the symbiotic partners receives the actions and uses the actions to affect a respective instance of the managed resource to maintain coherency of the managed resource. The managed resource may include data entities such as data file, data bases, configuration files and source files and other types of resources such as video images, symbiotic relationship configurations and executables. Alterations made to an instance of the managed resource are made to each other instance of the managed resource to maintain coherency. When establishing a symbiotic relationship among symbiotic partners, instances of managed resources are first synchronized to ensure that a common starting point exists. Then, each instance of the managed resource is operated upon based upon the actions, typically via an application program. The actions are generated from user input at one of the symbiotic partners. Prior to their use, the actions may be converted to commands that are readily received by the application program to operate upon a managed resource. In a symmetric symbiotic relationship, actions may be created by both of a set of two symbiotic partners to affect the managed resources. In an asymmetric symbiotic relationship, only one of a set of two symbiotic partners may create actions that affect the managed resources.

19 Claims, 12 Drawing Sheets

MAINTAINING COHERENCY IN A SYMBIOTIC COMPUTING SYSTEM AND METHOD OF OPERATION THEREOF

PRIORITY CLAIM TO PRIOR APPLICATION

The present application claims priority pursuant to 35 U.S.C. Sec. 119(e) to U.S. Provisional Application Ser. No. 60/085,421, filed May 13, 1998, now abandoned which is hereby incorporated herein by reference in its entirety.

BACKGROUND

1. Technical Field

The present invention relates generally to the field of distributed computer systems; and more particularly to a symbiotic computing system that establishes symbiotic relationships between a plurality of computers wherein the symbiotic relationships operate to establish and maintain coherency among managed resources that are located on the plurality of computers.

2. Related Art

Computer networks are generally known to include a plurality of physically separated computers coupled by communication links. The computers may include mainframe computers, personal computers, hand-held computers, wearable computers and other types of computers. The communication links may include wired networks such as local area networks and wide area networks, the Internet, public telephone subscriber lines that support communications between computers as well as voice communications, wireless networks and other communication networks that may be employed to facilitate digital communications among the computers. Computers are networked so that data may be passed among the computers. Sharing resources, facilitating communications, exchanging data, supporting voice and video communications, facilitating electronic messaging and facilitating electronic commerce are a few of many tasks that are enabled by the computer network.

Resource sharing is a common purpose when establishing a computer network. Shared resources may include data files, application programs, data bases, processing capacity and communication resources, among many other shared resources. In the sharing of resources, security, reliability, availability and appropriateness of the shared resources are primary concerns. However, with the distributed nature of the members of the computer network and the reliability of the computers, satisfying such concerns is often difficult.

Because most computer networks interface to the Internet, or to another larger network via a dedicated or dial-up connection, each computer coupled to the network is susceptible to break-in in which case data may be stolen or destroyed. While firewalls and other safeguards may be placed to increase the security of the network, data passing between computers on the network may be easily "snooped" by a third party listener. Since it is common for complete data files that contain sensitive information to pass from computer to computer on the computer network, the data files may easily be captured in full by the snooping third party. Additionally, snooping is much easier to accomplish on the Internet or another public accessible network.

The availability of shared resources, such as data files, is another primary concern in the operation of computer networks. Suppose that a particular computer on a computer network has resident thereupon a data file that requires access by other computers coupled to the network. When the network is operating properly and the particular computer is also operating and coupled to the computer network, each other computer may access the data file. However, when the network is unreliable, the data file may become unavailable even though it is resident upon a networked computer. The location of data files also affects their availability. When data files are stored on a tape drive, for example, access to the data file via the tape drive may require human intervention within an inconvenient amount of time.

The appropriateness of shared resources is another primary concern. When a data file becomes corrupt, a prior version of the data file, perhaps stored on a more secure medium, is retrieved and used as a replacement. However, any changes that have been made to the data file since the backup was made have been lost. Further, the environment within which the data file is used may have been altered since the backup was made. In either case, the backup copy of the data file may not function within the environment.

To increase the reliability of shared data, backups are often maintained on tape backup devices. While this successfully increases reliability of the shared data, it causes problems with respect to appropriateness and availability of the backed-up shared data.

Many applications are dependent upon the reliability of the computer network. For example, in the case of a computer network supporting multiple cash registers within a department store, each cash register accesses a server via the computer network during each transaction. When the computer network is down, the cash register immediately fails to operate and does not function until the computer network again becomes available.

Thus, there is a need in the art for a system that overcomes these shortcomings related to the sharing of resources in a computer network and that compensates for some of the shortcomings related to the availability and reliability of both the computers coupled to the computer network and of the computer network itself.

SUMMARY OF THE INVENTION

Thus, to overcome the above shortcomings relating to data security, data reliability, data appropriateness and data availability, a symbiotic computing system constructed according to the present invention performs symbiotic computing on a managed resource. The symbiotic computing system includes a plurality of symbiotic partners that are communicatively coupled with one another and each of which has a respective instance of a managed resource. One (or more) of the symbiotic partners receive input that affects a respective instance of the managed resource. Based, upon the input, the symbiotic partner produces actions based upon the input and transmits the actions to each other of the symbiotic partners. Upon receipt, each other of the symbiotic partners receives the actions and uses the actions to affect a respective instance of the managed resource to maintain coherency of the managed resource.

The managed resource may include data entities such as data files, data bases, configuration files and source files. However, the managed resource may include other types of resources as well such as video images, symbiotic relationship configurations, applications, executables and other resources that may be stored on a computer. With each of these managed resource types, alterations made to an instance of the managed resource are made to each other instance of the managed resource to maintain coherency.

When establishing a symbiotic relationship among symbiotic partners, managed resources are first synchronized to ensure that a common starting point exists. Then, from the common starting point, each instance of the managed resource is operated upon based upon the actions, typically via an application program. The actions are generated from user input (or a program) at one of the symbiotic partners. Prior to their use, the actions may be converted to commands that are readily received by the application program to operate upon a managed resource.

Because only actions pass between symbiotic partners to maintain the symbiotic relationship, data security is greatly enhanced. Further, symbiotic operations enhance the strength of encryption because the context helpful for breaking the encryption code is not present in the actions. Even if the actions are snooped, the actions generally have little or no value without a copy of the managed resource. Further, because a coherent copy of the managed resource resides upon each symbiotic partner, data availability and data reliability are greatly enhanced.

Symbiotic relationships may be symmetric or asymmetric. In a symmetric symbiotic relationship, actions may be created by both of a set of two symbiotic partners to affect the managed resources. In an asymmetric symbiotic relationship, only one of a set of two symbiotic partners may create actions that affect the managed resources. Of course, a symbiotic relationship may be established between multiple symbiotic partners have both symmetric and asymmetric components.

Symbiotic computing may be established in any various type of network architecture or network configuration. For example, the symbiotic computer system may reside within a client/server environment, a peer-to-peer environment or in an object oriented environment, among others. The requirements and benefits of symbiosis provide significant benefits in any environment by supporting relatively low bandwidth management of resources.

In establishing symbiotic operation within the symbiotic computing system, synchronization among all instances of the managed resource must first be established. Then, the symbiotic relationships are defined such that input may be received by one or more of the symbiotic partners. Once the relationships are defined, operations continue to maintain coherency of all instances of the managed resource. However, glitches in operation caused by computer outages, software bugs, computer failures, network problems, inconsistent actions and/or other problems may indicate that a problem exists with maintaining coherency. When such problems exist, checks are performed to determine whether the symbiosis is operating properly. If not, recovery is initiated to cause the instances of the managed resource to again be coherent. Once completed, operation continues. When inconsistent actions and/or problems exist, other techniques may also be employed to move forward in the operation of the system without initiating a recovery operation. These techniques will modify the managed resource using a set of rules or will reject one or more of the inconsistent actions.

Moreover, other aspects of the present invention will become apparent with further reference to the drawings and specification which follow.

DETAILED DESCRIPTION OF THE DRAWINGS

Figure 1:
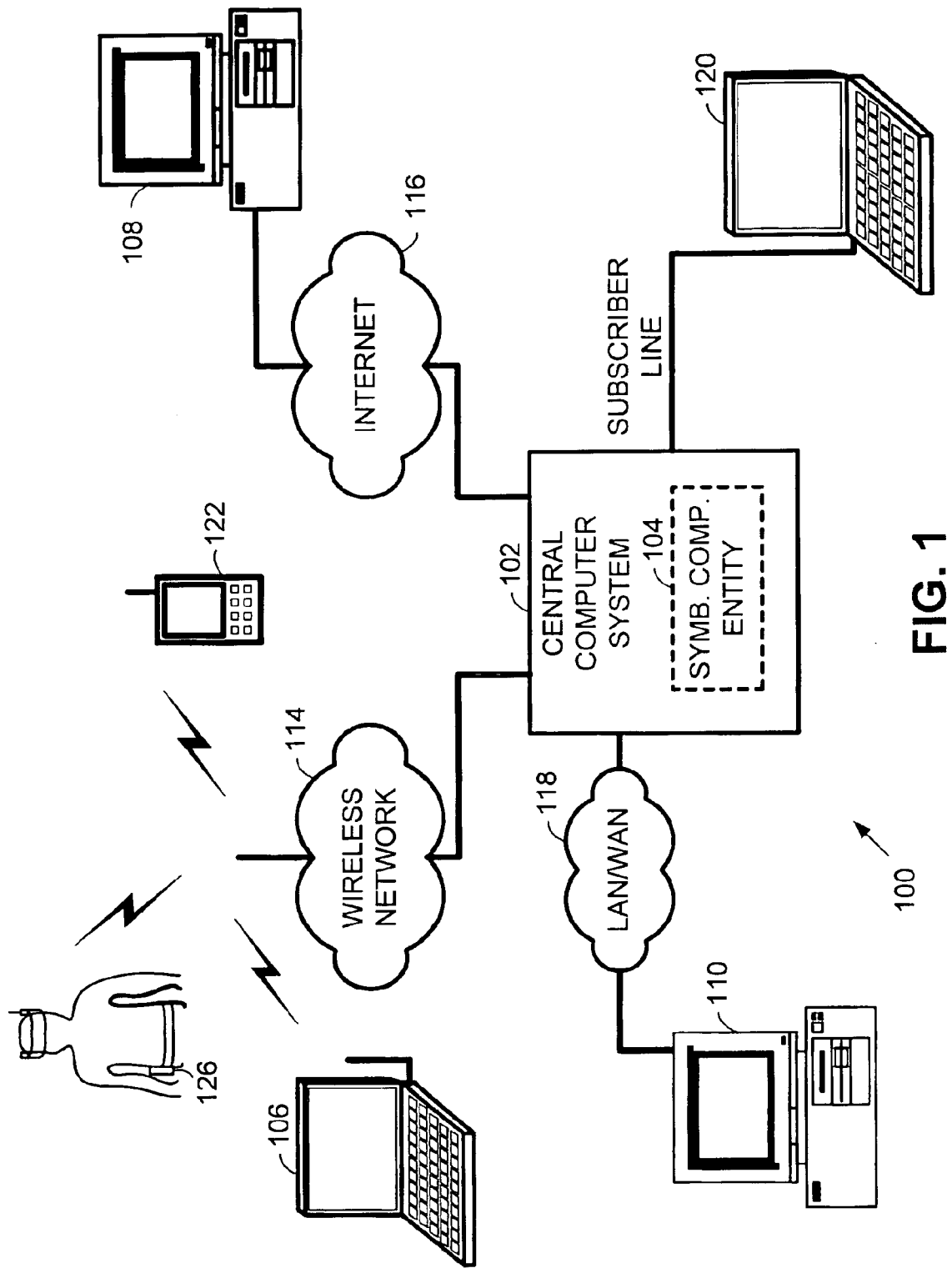
FIG. 1 illustrates a symbiotic computing system constructed according to the present invention that is installed upon a network of computers.

FIG. 1 illustrates the installation of a symbiotic computing system 100 constructed according to the present invention. The symbiotic computing system 100 includes a plurality of computers, each of which may reside physically apart from each other of the computers. The computers include a central computer system 102, laptop computers 106 add 120, desktop computers 108 and 110, wearable computer 126 and hand-held computer 122. Each of these computers 102, 106, 108, 110, 120, 122 and 126 couples to each other of the computers via various communication links. The system 100 illustrated is commonly referred to as a client/server system in which the central computer system 102 provides server type functions to the other computers which serve as clients. The central computer system 102 may provide file storage functions, communication broadcast functions, database functions, and various other functions typically provided by a centralized server. The central computer system 102 may also perform network management functions, managing the resources of each served client.

The communication links provided each have their own characteristics. For example, laptop computer 106, wearable computer 126 and hand-held computer 122 couple to the central computer system 102 via a wireless network 114. The wireless network 114 allows the laptop computer 106, wearable computer 126 and hand-held computer 122 to be mobile but yet to maintain relatively low bandwidth communications with the central computer system 102. Further, desktop computer 108 couples to the central computer system 102 via the Internet 116 and desktop computer 110 couples to the central computer system 102 via a Local Area Network (LAN) and/or a Wide Area Network (WAN). The Internet 116 and the LAN/WAN 118 provide relatively higher bandwidth connections but provide little or no mobility benefits. Moreover, laptop computer 120 couples to the central computer system 102 via a subscriber line, such as an Integrated Services Digital Network (ISDN), Asynchronous Digital Subscriber Line (ADSL) or Plain Old Telephone Service (POTS) line. While the subscriber line is relatively low in cost, it often provides little bandwidth, or relatively greater bandwidth at a much higher price.

Each of the computers has resident thereupon a symbiotic computing entity constructed according to the present invention. While a symbiotic computing entity 104 is shown resident upon central computer system 102, symbiotic computing entities are also resident upon the other computers, 106, 108, 110, 120, 122 and 126 but are not explicitly shown in FIG. 1 due to figure size and resolution constraints. As will be further described herein, each of the symbiotic computing entities is executed via software instructions upon available or modified hardware components or by customized hardware components.

According to the present invention, symbiotic relationships are established between the computers of the system 100. In a symbiotic relationship, managed resources of the symbiotic partners are synchronized such that operations performed upon the managed resources of one of the symbiotic partners are also performed upon the managed resources of each of the other symbiotic partners so that coherency is maintained among the managed resources. When a managed resource comprises a data file, for example, operations performed upon the data file of one of the symbiotic partners are also performed upon the data file of each other of the symbiotic partners so that the data files are affected in the same or similar fashion. When resources being maintained comprise operations other than data file operations, such as operations that include compilation, messaging, video editing and display, for example, the symbiotic computing system operates so that managed resources are on all symbiotic partners are equally affected. Symbiotic computing may be used to manage the network so that applications are properly updated and maintained as well.

The particular installation of FIG. 1 serves the telecommuters of a distributed corporation. Each of the telecommuters is physically remote from at least one other of the telecommuters. However, each of the telecommuters must have full access to the information and work product produced by each other of the telecommuters. Thus, the central computer system 102 provides a central location upon which shared resources are stored. In such case, each of the computers, 106, 108, 110, 120, 122 and 126 has a symbiotic relationship with the central computer system 102. Such symbiotic relationships cause managed resources of the computers 106, 108, 110, 120, 122 and 126 to be coherent with symbiotic resources on the central computer system 102.

For example, a telecommuter user of the desktop computer 108 manages specifications for products manufactured and sold by the distributed corporation. Each other of the telecommuters requires access to these specifications but cannot obtain copies of the specifications from the desktop computer 108 and a copy of the specifications must be available on the central computer system 102. However, due to the size of the specifications, frequently downloading the specifications is not convenient. Thus, a symbiotic relationship is established between the desktop computer 108 and the central computer system 102 for the specifications which are designated as managed resources. With the symbiotic relationship, while disk space is consumed to store multiple copies of the specification, bandwidth employed to maintain coherency of the multiple copies of the specification is minimized. Further, because the complete contents of the specification are not transferred among the computers 106, 108, 120 and 110, the contents of the specification are substantially secure.

In the symbiotic relationship, any changes made to the specifications by the telecommuter using the desktop computer 108 are captured as actions. These actions produce commands which affect the managed resources locally on desktop computer 108. These actions are also packaged by the symbiotic computing entity on the desktop computer 108 and transmitted to the central computer system 102. On the central computer system 102, symbiotic computing entity 104 receives the actions, converts the actions to commands consistent with the resources available on the central computer system 102 and affects the managed resources (specifications) resident on the central computer system 102 in a coherent manner. With this resource management occurring, a current copy of the specifications will always be resident upon the central computer system 102. However, because the operations according to the present invention require little communication bandwidth or resource overhead, the resources are managed with little cost.

In another example of operation of the symbiotic computing system 100, a telecommuter using laptop computer 106 is a programmer who travels frequently. However, while the telecommuter is traveling, he creates and modifies computer code. For data security and revision management, all resources that are affected locally on the laptop computer 106 have corresponding resources on the central computer system 102. Thus, a symbiotic relationship is established for the managed resources between the laptop computer 106 and the central computer system 102. When the telecommuter modifies a source code file upon his laptop computer 106, the symbiotic computing system 100 operates to modify the corresponding source code file resident on the central computer system 102.

Further, when an object file(s) that may be constructed based upon the source code file is also a managed resource, if the telecommuter locally compiles the source code file to create an object file, the corresponding source code file resident on the central computer system 102 is also compiled to create a corresponding object file on the central computer system 102. Moreover, if the executable file is also a managed resource, when a linker application is employed to create the executable file on the laptop computer 106, a corresponding executable file is also created on the central computer system 102. Thus, coherency of the managed resources is maintained during such operations. If the executable file is an application program within a symbiotic environment, then that application program may be updated with the executable via a symbiotic operation (thus affecting all symbiotic partners), a copy or another update operation. Then, the application would function as normal within the symbiotic environment, but in its updated form.

Symbiotic relationships may be established such that they are "symmetric" or "asymmetric." In a symmetric symbiotic relationship, any of the symbiotic partners may alter a managed resource. In the symmetric symbiotic relationship, any and all of these changes are made to the managed resources of each symbiotic partner. However, in an asymmetric symbiotic relationship, only changes made by one of the symbiotic partners may produce actions that affect the managed resource. Access to the managed resource may be limited consistent therewith to prevent undesired alterations to the managed resource by other of the symbiotic partners. The previous example in which the central computer system 102 maintains a copy of specifications for computer 108 is an example of an asymmetric symbiotic relationship.

In another operation of the system 100, the central computer system 102 may not serve as a repository for all data. Instead, symbiotic relationships may be established such that other of the computers are symbiotic partners and the central computer system 102 simply passes actions between the symbiotic partners without intervention. When the central computer system 102 is not a symbiotic partner but passes actions among the symbiotic partners, it serves as a "symbiotic gateway" for the symbiotic partners.

Figure 2:
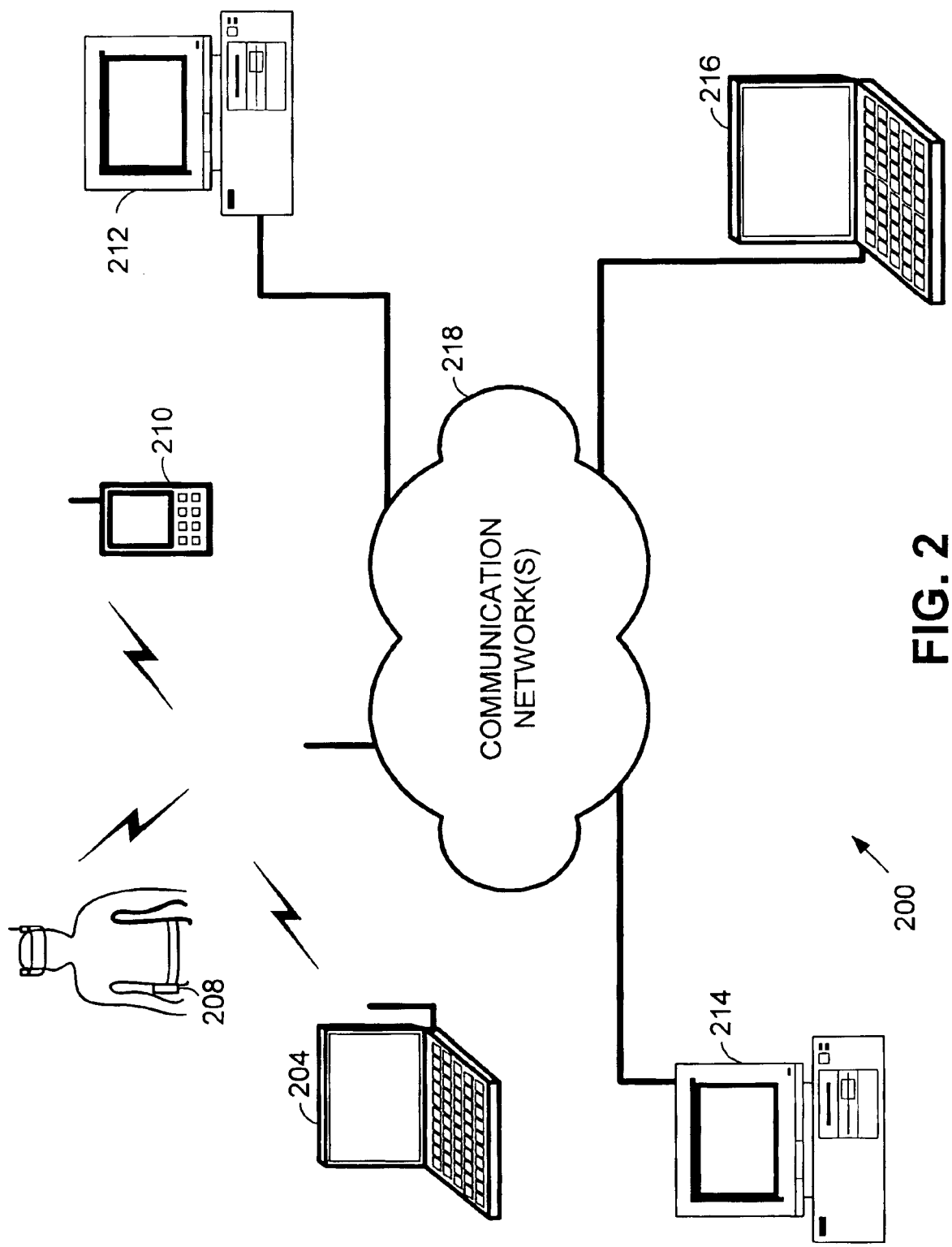
FIG. 2 illustrates an alternate installation of a symbiotic computing system constructed according to the present invention that is installed upon a network of computers.

FIG. 2 illustrates an alternate installation of a symbiotic computing system 200 constructed according to the present invention. As compared to the construction of the system 100 of FIG. 1, the symbiotic computing system 200 does not include a central computer system. Thus, in the system 200, symbiotic relationships are established between peer computers to maintain coherency of managed resources contained on the peer computers. Such peer computers include laptop computers 204 and 216, desktop computers 212 and 214, wearable computer 208 and hand-held computer 210. The peer computers 204, 216, 212, 214, 208 and 210 communicatively couple to one or more communication network(s) 218.

In an example of operation of the symbiotic computing system 200, it is desirable for databases contained upon laptop computers 204 and 216 to have identical contents at all times since the database contents are relied upon respective sales persons. However, each sales person may perform operations upon her copy of the database at any time which affects her copy. These changes must be available to both sales persons as soon as possible after the changes are made. In operation according to the present invention, a symbiotic relationship is established wherein laptop computers 204 and 216 are symbiotic partners and the corresponding databases are managed resources. In the symbiotic relationship, any changes made to either database is also made to the other database so that the databases are coherent with one another. Since only the changes are transmitted between the laptop computers 204 and 216, little bandwidth is consumed by the symbiotic relationship.

Symbiotic relationships within the system 200 may be "minimal," "partial" or "full." A minimal symbiotic relationship includes only two symbiotic partners, such as would be the case when a symbiotic relationship were established between laptop computer 204 and desktop computer 214. Such a minimal symbiotic relationship may be symmetric or asymmetric, depending upon how the symbiotic relationship is defined. A full symbiotic relationship is established when all computers within a defined group are symbiotic partners. For example, in the system 200, if computers 204, 208, 210, 212, 214 and 216 are all symbiotic partners, a full symbiotic relationship exists for the system 200. A partial symbiotic relationship exists when more than two, but less than the full set of computers 204, 208, 210, 212, 214 and 216 resides within the symbiotic relationship.

Another application of the symbiotic computing systems of FIGS. 1 and 2 is that of video teleconferencing. Because the transmission of real-time video requires significant communication bandwidth, methodologies may be employed to create virtual video-images that consume significantly less communication bandwidth so that a computer network may be employed as a communication link. One such technique is described in U.S. patent application Ser. No. 09/306,313, filed by Thomas W. Lynch on May 6, 1999, and hereby incorporated herein by reference in its entirety. In the disclosed technique, a virtual video image of a user is created from a video image library (video image database) at one or more remote sites based upon cues gathered from the user. In a teleconferencing application, each attendee of the teleconference should be presented with an identical virtual video image of the user. Thus, according to the present invention, the virtual video image is designated as a managed resource and the computer of each attendee creating and displaying the video image of the user is made a symbiotic partner so that the images presented are identical.

In creating the video images, the video image library may be constructed as a database with each video image a database entry. In such case, the database may also be designated a managed resource among the participating computers. Then, when any of the video images is altered by any of the symbiotic partners, the managed resource resident on each other of the symbiotic partners is also modified accordingly. Such alterations may be changes to pixels within video images, MPEG updates, rotations, skews, sequencing or other actions that affect the affects images in the video library.

Another technique for creating a video image includes determining the differences between adjacent video frames and transmitting only the differences to other locations. In this video image generation technique as well, the video image may be selected as a managed resource with the computers upon which the image is displayed being symbiotic partners. As would be the case with the immediately preceding example, the symbiotic relationship would be an asymmetrical relationship since the image cues or image differences would be generated at the video capture symbiotic partner location and transmitted to each other symbiotic partner location.

During normal operation, all computers 204, 208, 210, 212, 214 and 216 are fully available and function and the communication networks 218 are also fully available and functional. However, when these conditions are not met, operation of the symbiotic relationship is affected and recovery must be performed to account for the change in resource availability. The manner in which recovery depends not only upon the particular failure but upon the nature of the symbiotic relationship itself.

For example, assume that a symmetrical symbiotic relationship exists between laptop computers 204 and 216 and desktop computers 212 and 214 and the managed resource includes a data file. During normal operation, any of the symbiotic partners may affect the managed resource. Further, assume that laptop computer 204 becomes fully unavailable, its network connection fails, an application that services the symbiotic relationship fails or that some other failure occurs that prevents the laptop computer 204 from functioning within the symbiotic relationship. When the laptop computer 204 becomes unavailable, any actions produced by laptop computer 204 will not be transmitted to the other symbiotic partners. Further, any actions produced by any other symbiotic partner will not be transmitted to the laptop computer 204.

In recovering from such a failure, various recovery techniques may be employed. Using a first recovery technique, actions produced by each symbiotic partner are buffered for later exchange with the laptop computer 204. Actions produced by laptop computer 204 are buffered at laptop computer 204 and actions produced by each other of the symbiotic partners 216, 212 and 214 are either locally buffered or buffered by a symbiotic gateway. When laptop computer 204 becomes available, the actions intended for laptop computer 204 that have been buffered are transmitted to laptop computer 204 and executed. Further, the actions produced by the laptop computer 204 that have been buffered are transmitted to the other symbiotic partners for execution.

The laptop computer 204 may not become available within a reasonable time period. Thus, when the unavailability of laptop computer 204 becomes known, a timer is set that, when it expires, causes the symbiotic relationship of laptop computer 204 to be severed. Such a timer may reside upon each of the other symbiotic partners or upon a symbiotic partner that has been designated to oversee the symbiotic relationship.

Figure 3:
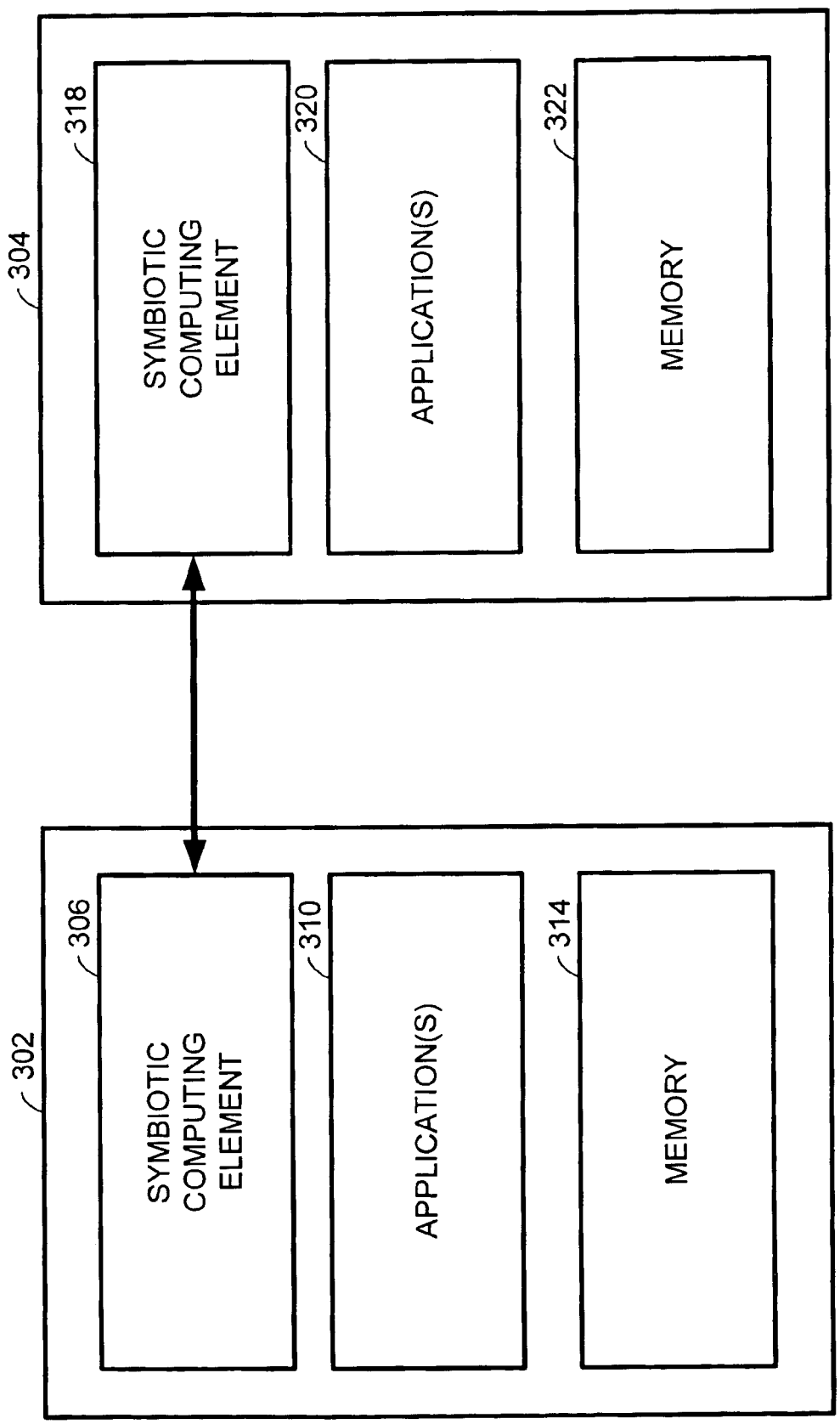
FIG. 3 is a block diagram illustrating generally some of the components of symbiotic partner host systems that are constructed according to the present invention.

FIG. 3 illustrates generally some of the components of symbiotic computing entities and the symbiotic partner host systems 300 upon which processes reside. A first symbiotic partner host system 302 includes a symbiotic computing entity 306, application(s) 310 and memory 314. A second symbiotic partner host system 304 includes a symbiotic computing entity 316, application(s) 320 and memory 322. Applications 310 and 320 may include word processors, spreadsheet programs, data base programs, presentation programs, graphics programs, computer aided design programs, computer aided engineering programs, computer aided manufacturing programs, and calendar programs, among others. Thus, the applications 310 and 320 include any programs that may be operated by user action, script input and other inputs. The memory 314 and 322 may include dynamic random access memory, static memory, disk drives, optical drives, tape drives and any other device that provides memory functions. In a typical installation, the applications 310 and 320 operate upon the memory based upon actions of a user or other actions.

Particular files, particular applications, combinations of files and applications, operating scenarios and other resources may be managed resources according to the symbiotic computing operations of the present invention. Once a symbiotic relationship is established between host systems 302 and 304, the symbiotic computing entities 306 and 318 operate maintain coherency between the managed resources. As shown, each of the symbiotic computing entities 306 and 318 relies upon applications 310 and 320, respectively, in maintaining the symbiotic relationship. Should one of the applications 310 or 320 fail, recovery must be performed to either modify the symbiotic relationship or to cause resynchronization of the managed resources of the symbiotic relationship.

The symbiotic relationship between symbiotic partners may be either "pure" or "hybrid." In a pure symbiotic relationship, only actions are passed between symbiotic partners, the actions operating via an application to affect a managed resource. In a hybrid symbiotic relationship actions as well as other interchanges are passed between symbiotic partners. These operations may include file downloads and other exchanges that are initiated based upon user input but are chosen in lieu of actions. Reasons for choosing operations in lieu of actions may be dictated by the type of user input received or may be to reduce traffic on the computer network coupling the symbiotic partners.

Figure 4:
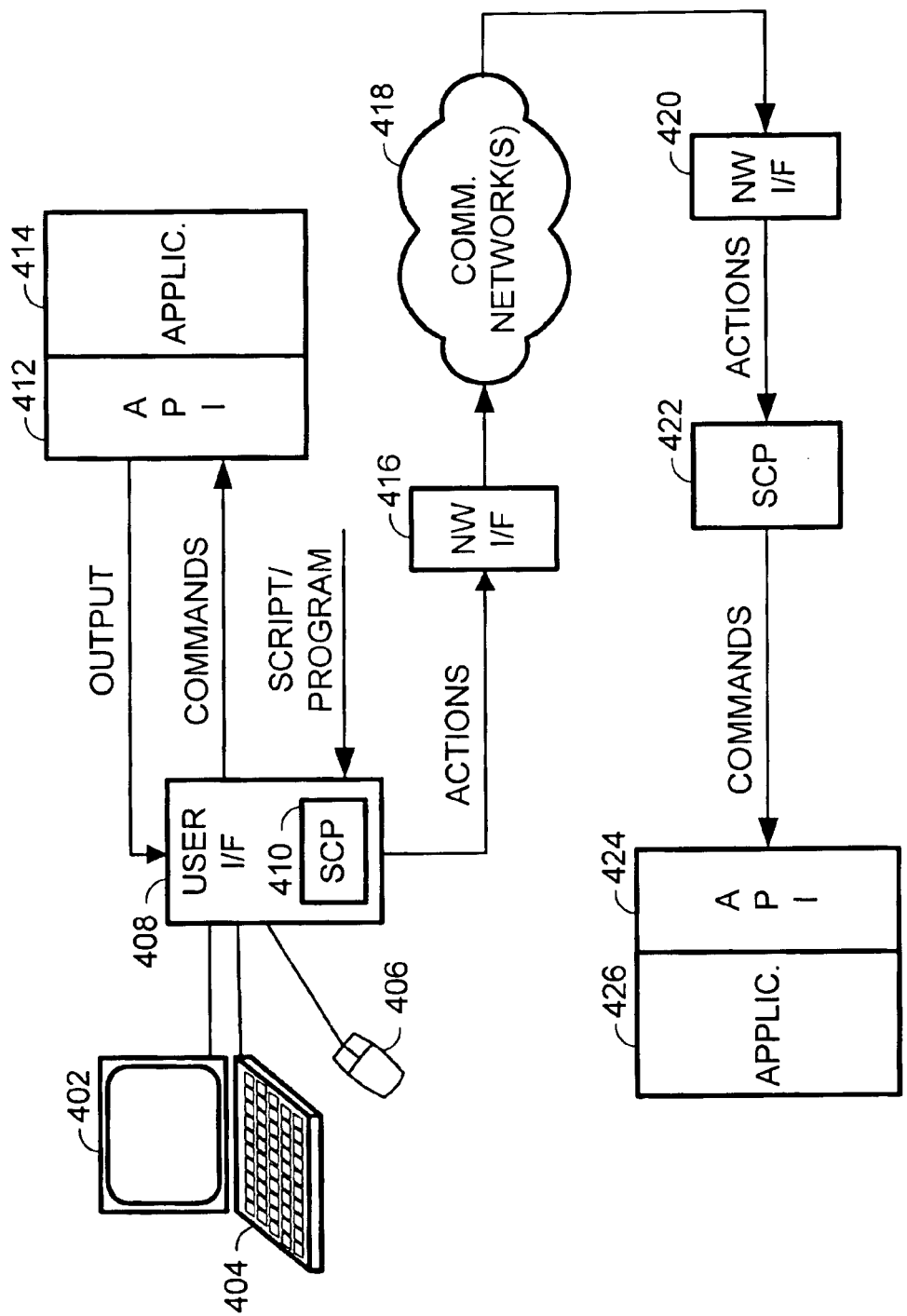
FIG. 4 is a block diagram illustrating the flow of data exchanges in a symbiotic computing system constructed according to the present invention in which coherency is maintained between managed resources of symbiotic partners.

FIG. 4 is a block diagram illustrating operative flow in a symbiotic computing system 400 constructed according to the present invention in which coherency is maintained between managed resources of symbiotic partners. A first symbiotic partner includes monitor 402, keyboard 404, mouse 406, user interface 408, an application program interface (API) 412 that facilitates interface with an application program 414 and a network interface 416. A second symbiotic partner includes a network interface 420, a symbiotic computing entity 422 and an application program interface 424 that facilitates interface with an application program 426. The application programs 414 and 426 operate upon respective managed resources in the present example which considers operation based upon user input received by the first symbiotic partner. Such operations may be performed either in a symmetrical or asymmetrical symbiotic relationship. In the example of FIG. 4, however, only the flow from the first symbiotic partner to the second symbiotic partner is considered. If the symbiotic relationship between the symbiotic partners is symmetric, flow will occur in the opposite direction in the same or similar manner.

Input is received by the user interface 408 from the keyboard 404 or the mouse 406. The user interface 408 converts the input to commands and sends the commands to the API 412 which causes the application 414 to perform operations upon the managed resources. The user interface 408 may also receive input from other computer resources, such input generated by script files, master programs and other applications, for example. The symbiotic computing entity 410 operates in conjunction with the user interface 408 to produce actions corresponding to the input. The symbiotic computing entity 410 then transmits the actions to the network interface 416 which packages the actions appropriately and sends the packaged actions via the communication networks 418 to the network interface 420.

The network interface 420 of the second symbiotic partner unpackages the actions and passes the actions to the symbiotic computing entity 422. The symbiotic computing entity 422 converts the actions to commands and passes the commands to the API 424 associated with application 426. In creating the commands, the symbiotic computing entity 422 determines whether differences exist between API 412 and API 424 and/or application 414 and application 426. If differences exist that would affect the manner in which the managed resources would be altered, the symbiotic computing entity 422 generates commands accordingly to maintain coherency of the managed resources. However, in another implementation, it is assumed that API 412 and application 414 operate consistently with API 424 and application 426, respectively.

In any symbiotic relationship, actions may be buffered at a receiving symbiotic partner without execution by an application. Further, the exchange between symbiotic partners may be of a form other than actions, such as file downloads, etc. In such cases, the exchanges will not be executed by an application program via an API. When the actions are buffered, they may reside unexecuted until a user accesses the application, until a time reference is reached or until such other time as is determined to be useful.

Actions may also be buffered at the sending partner. When the symbiotic relationship includes a laptop computer, for example, the user of the laptop computer may work on an airplane for a period of time during which the laptop computer operates in a stand-alone mode with respect to the computer network. Upon reconnection to the computer network, the laptop computer transmits the actions to its symbiotic partners for execution. Such operation works particularly well when the symbiotic relationship is asymmetric and the symbiotic partner resident upon the laptop computer is the only symbiotic partner that may generate actions. Alternatively, upon receiving the actions, the receiving symbiotic partners may execute recovery to consistently update the managed resource(s). In a symmetric relationship, the laptop computer also receives actions and it may execute recovery to consistently update the managed resource(s).

Because only actions are passed between symbiotic partners, data security is greatly increased. One snooping the network in an attempt to obtain a copy of the managed resource obtains only the actions, which typically represent only changes to be made to a managed resource. Without possession of the managed resource, or a current version of the managed resource, the actions give little or no indication of the contents of the managed resource.

When establishing the symbiotic relationship, a reference state must initially be established or assumed. Thus, in establishing the reference state it is still critical that the managed resource be kept secure. However, once the reference state is established, transmission of the actions themselves, even without encryption, provides a significant security advantage.

A managed resource may itself comprise a symbiotic relationship. Because the structure and status of a symbiotic relationship must be coherently understood among all symbiotic partners, the symbiotic relationship itself, receives great advantage from being a managed resource.

Figure 5A:
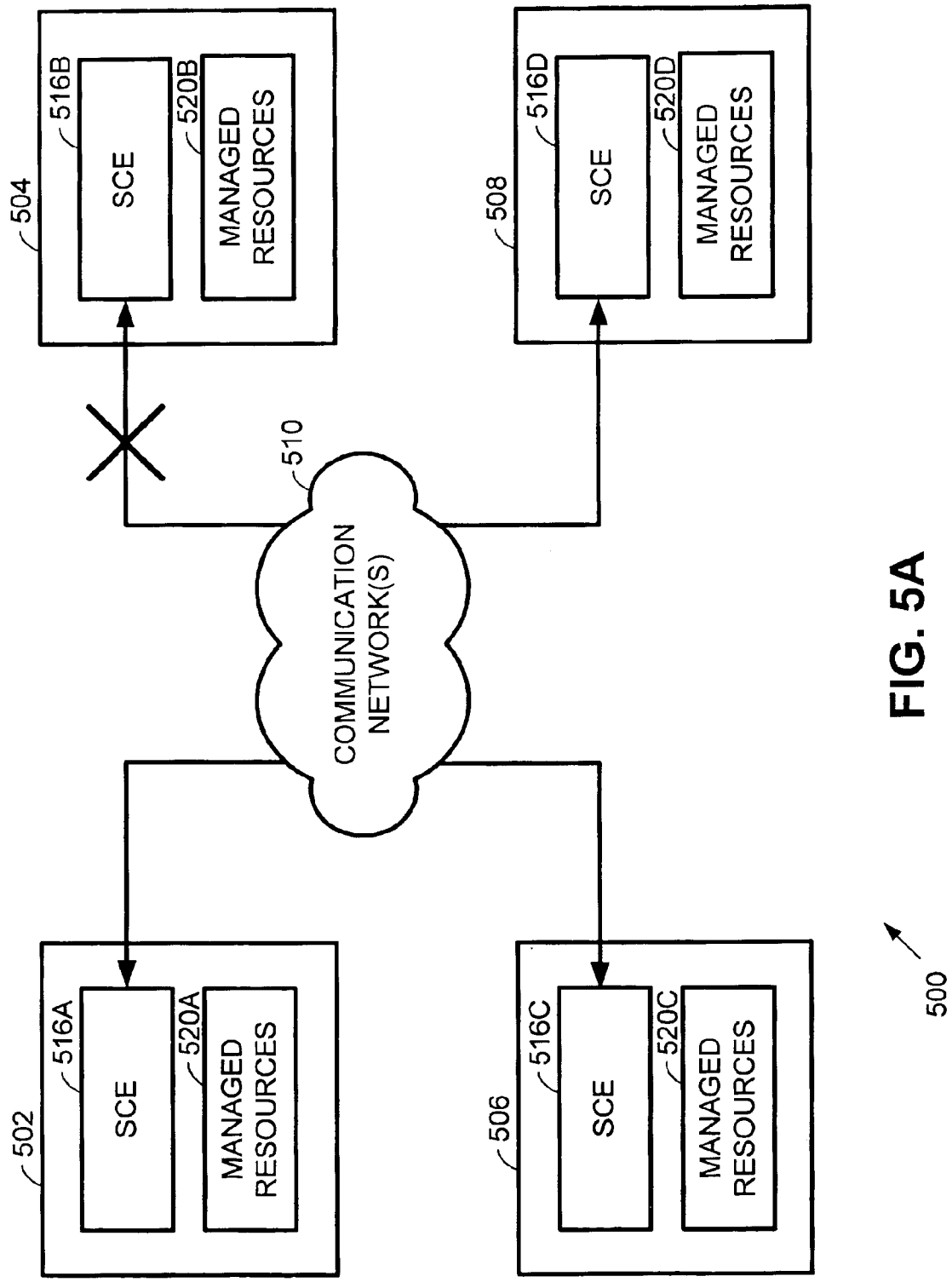
FIG. 5A is a block diagram illustrating generally an installation of a symbiotic computing system according to the present invention in which coherency of managed resources is maintained.

FIG. 5A illustrates generally an installation of a symbiotic computing system 500 according to the present invention in which a plurality of symbiotic partners 502, 504, 506 and 508 couple via a communication network(s) 510. Each symbiotic partner 502, 504, 506 and 508 includes a symbiotic computing process, 516A, 516B, 516C and 516D, respectively. Further, each symbiotic partner 502, 504, 506 and 508 includes at least one managed resource, 520A, 520B, 520C and 520D, respectively.

Various operations are allowed and/or supported based upon the type of symbiosis implemented. Assuming that a symmetric symbiotic relationship exists between all of the symbiotic partners 502, 504, 506 and 508, any of the plurality of symbiotic partners 502, 504, 506 and 508 may alter the managed resources, 520A, 520B, 520C and 520D via user input. However, in asymmetrical symbiosis, only a designated one or few of the symbiotic partners 502, 504, 506 and 508 may alter the managed resources via user input.

Further, a symbiotic relationship may be established including the symbiotic partners 502, 504, 506 and 508 wherein the relationship is symmetric for more than one symbiotic partners but asymmetric for one or more other symbiotic partners. For example, assume that a symbiotic relationship exists between symbiotic partners 502, 506 and 508 that is symmetric for symbiotic partners 502 and 504 but asymmetric for partner 508. Thus, user input received at symbiotic partners 502 and 504 will affect all managed resources 520A, 520B and 502D. However, symbiotic partner 508 is unable to affect the managed resources and serves only as a repository of the managed resource.

Varying degrees of redundancy may be employed in establishing the symbiotic relationships to guarantee data availability, appropriateness and reliability. As was previously described, minimal symbiosis requires only that a managed resource exist on two symbiotic partners, for example symbiotic partners 502, 504 and 506. Full symbiosis requires that each symbiotic partner 502, 504, 506 and 508 maintain the managed resource. Further, partial symbiosis requires that more than two, but less than all available computers, maintain the managed resource. In determining what level of symbiosis to implement, the relative requirements of availability, appropriateness are considered. The level of symbiosis should be chosen based upon the tradeoff between symbiotic operation overhead, network loading, relative data availability, appropriateness and reliability requirements among other considerations.

Operation of the symbiotic relationship may become corrupt when received actions are incompatible with one another. In the case of a symmetric symbiotic relationship, multiple symbiotic partners, e.g. 502, 504 and 506 may submit actions to operate on a single managed resource 520D at symbiotic partner 508. Network latencies, unavailability of symbiotic partners, inconsistent clocks and various other reasons may cause actions to be delayed so that, upon receipt, the actions are incompatible. For example, suppose that symbiotic partners 502, 504 and 506 each submit actions for the managed resource. However, due to network latency, the actions are received out of order at symbiotic partner 508.

Time related indicia are used to determine when received actions are inconsistent other received actions or that are otherwise invalid. Once such time related indicia is a time stamp that is appended to the actions by the sending symbiotic partner. Another time related indicia is based upon network latency and is accessible by the receiving symbiotic partner(s) to determine the latency in transmission. When either of these time related indicia, or another time related indicia, exceeds an expected value plus or minus a tolerance, the receiving symbiotic partner 508 determines that received actions are potentially inconsistent. However, to be inconsistent, received actions may also be checked for logical inconsistency. For example, assume that the symbiotic partner 508 receives actions from symbiotic partner 504 that, according to the time related indicia, should have been received prior to actions previously received from symbiotic partner 502.

The symbiotic partner 508 may determine that the actions are inconsistent for other reasons as well. For example, when the managed resource comprises a data file, operations performed based upon the actions may be inconsistent with the contents of the data file. Such operations may occur when one symbiotic partner deletes a paragraph while another symbiotic partner edits the paragraph. Many other conditions that result in inconsistencies could exist when more than one symbiotic partner is allowed to operate upon a managed resource at a time. Thus, one solution to this particular problem is to grant access to the managed resource to a single symbiotic partner at a time using a semaphore. In this operating scenario, even though the symbiotic relationship is at least partially symmetric, inconsistencies relating to concurrent modifications are avoided.

Should inconsistent actions occur, the receiving symbiotic partner 502 may either reject the one, some or all of the inconsistent actions or attempt to reconcile the inconsistent actions. When attempting to reconcile the inconsistent actions, the receiving symbiotic partner 508 may reorder the actions. If the actions may be reconciled by reordering, the receiving symbiotic partner 508 reorders the actions, executes or buffers the actions and operation continues. In reordering the actions, the inconsistent actions received from symbiotic partners 502 and 504 may be "time warped" so that they are reconcilable. Further, should alterations to the managed resource already have been made, these alterations may be undone prior to reordering.

However, in another operation, the receiving symbiotic partner 508 rejects the actions and notifies the "out of order"

sending symbiotic partner 504 that the actions were rejected. In response to the rejection received from the receiving symbiotic partner 508, the sending symbiotic partner 504 may back-off for a random time period and again transmit the actions to the receiving symbiotic partner 508. For example, this operation may continue for a number of iterations until the operation is deemed to have failed and resynchronization is required. Should such a failure occur, a report will be generated and symbiotic operations may cease until resynchronization has been successfully completed.

Figure 5B:
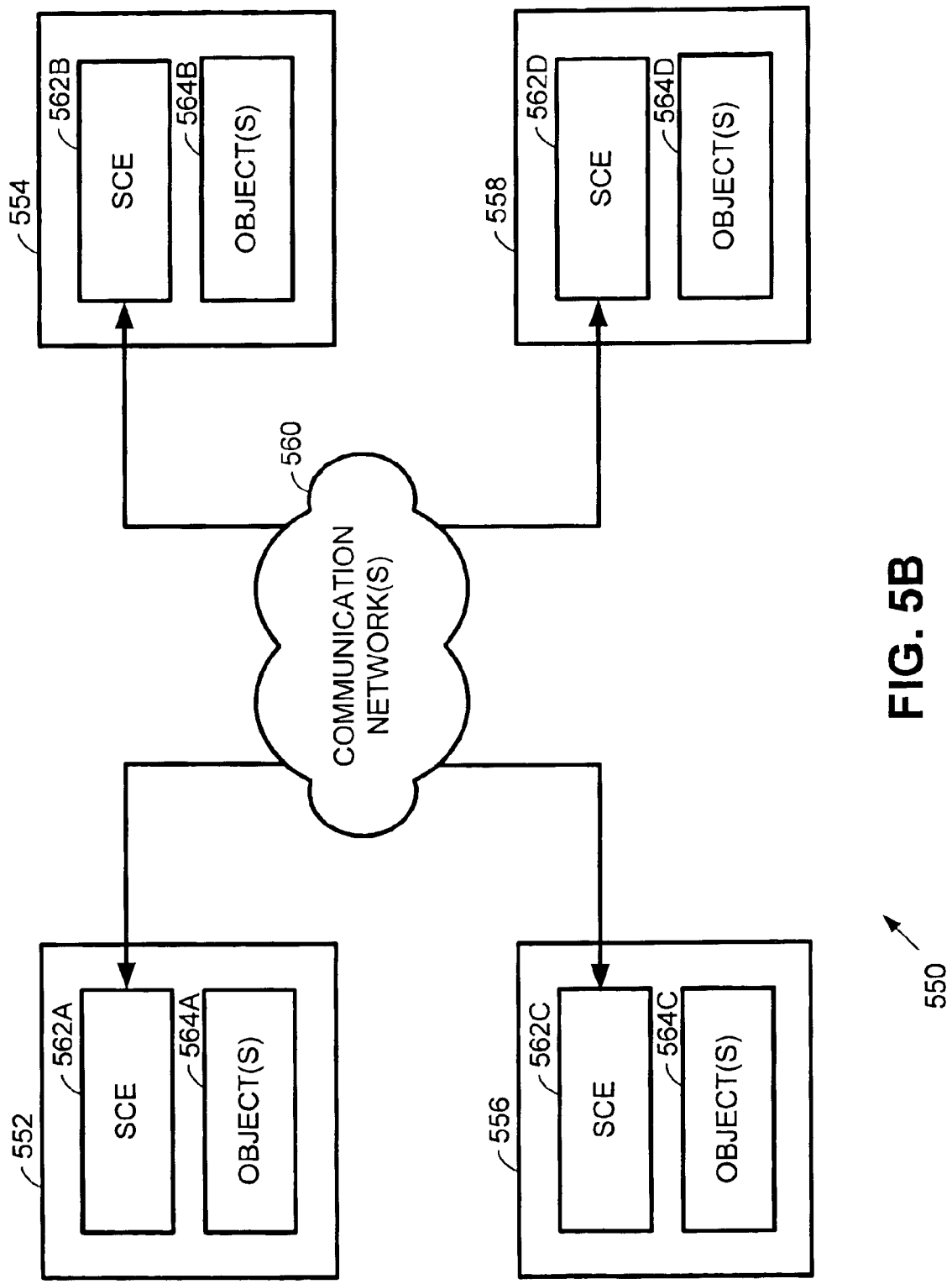
FIG. 5B is a block diagram illustrating generally an installation of a symbiotic computing system according to the present invention in which objects are shared among a plurality of symbiotic partners.

FIG. 5B illustrates generally an installation of a symbiotic computing system 550 according to the present invention in which objects are shared among a plurality of symbiotic partners 552, 554, 556 and 558 coupled by a communication network(s) 560. Each symbiotic partner 552, 554, 556, and 558 includes a symbiotic computing process, 562A, 562B, 562C and 562D, respectively. Further, each symbiotic partner 552, 554, 556 and 558 includes at least one object, 564A, 564B, 564C and 564D, respectively. Each of the objects 564A, 564B, 564C and 564D may be a data object, a processing object, a logical object or another type of object that may be employed in an object oriented system or another system.

The objects 564A, 564B, 564C and 564D may migrate over time among the symbiotic partners 552, 554, 556 and 558 to such location(s) as is appropriate for the operation of the system 550 as a whole. Thus, as the objects 564A, 564B, 564C and 564D move about the system 550, symbiotic relationships are affected. According to the present invention, for reliability, appropriateness and availability purposes, instances of each object 564A, 564B, 564C and 564D reside on multiple symbiotic partners 552, 554, 556 and 558. Thus, as objects 564A, 564B, 564C and 564D migrate over time among the symbiotic partners 552, 554, 556 and 558, so may other instances of the objects to provide reliability of the objects.

Varying degrees of symbiosis may be employed to guarantee data availability, appropriateness and reliability. Minimal symbiosis requires that instances of each object 564A, 564B, 564C and 564D reside only on two symbiotic partners. Full symbiosis requires that each symbiotic partner 552, 554, 556 and 558 maintains an instances of each object 564A, 564B, 564C and 564D. Partial symbiosis requires that more than two, but less than all, symbiotic partners 552, 554, 556 and 558 maintain instances of each object 564A, 564B, 564C and 564D.

As objects 564A, 564B, 564C and 564D move among the symbiotic partners 552, 554, 556 and 558, operations to provide coherency between instances of objects also changes. In a typical application, only the semaphore owner of an object may modify an object. Thus, actions which affect the object are only generated by the semaphore owner of the object and the symbiotic relationship is asymmetric. However, when the semaphore owner of the object changes, the symbiotic relationship retains its asymmetric nature, but, the identity of the source symbiotic partner changes. Thus, the symbiotic relationship must be altered according to the object operations currently ongoing.

Operation according to the present invention provides robust behavior in guaranteeing that duplicates of objects will be available at all times. For example, assume that symbiotic partner 554 owns the semaphore for object A and that symbiotic partner 556 retains an instance of object A at time T1. However, at time T1, a communication link between symbiotic partner 554 and communication network (s) 556 becomes unavailable. Symbiotic partner 554 determines that the communication link has become unavailable and initiates recovery. During recovery, symbiotic partner 554 remains as the semaphore owner of object A and may prevent modification to object A until the communication link again becomes available.

Should the communication link to symbiotic partner 554 be considered permanently unavailable, and if the prior symbiotic relationship for object A was a minimal symbiotic relationship, symbiotic partner 554 creates a new symbiotic relationship for object A. After the time-out period expires, or based upon further information received, symbiotic process 556 determines that it no longer operates as a symbiotic process for object A. If the prior symbiotic relationship was fully symbiotic or greater than minimally symbiotic, a new symbiotic relationship need not be established since at least two symbiotic partners exist for object A.

If the semaphore owner of an object loses communication with other symbiotic partners or becomes unavailable, a semaphore owner of an instance of the object initiates recovery with respect to the object. For example, assume that symbiotic partner 554 is the semaphore owner of object B and that symbiotic partner 552 retains an instance of object B at time T2. Further, at time T2, symbiotic partner 554 becomes unavailable. After a timeout period, symbiotic partner 552 determines that symbiotic partner is unavailable, investigates the established symbiotic relationship, determines that another of the symbiotic partners must become the semaphore owner of object B and determines whether the symbiotic relationship must be modified to establish a desired degree of symmetry. Upon making such determinations, symbiotic partner 552 proceeds accordingly.

Actions may arrive in a serial or parallel manner to the symbiotic computing entity. Actions which are turned into commands and affect data are said to be taken actions, actions which are queued (buffered) are said to be pending actions. Taken actions are two kinds, reversible and non-reversible. Non-reversible actions are also said to be entropic.

Actions are ordered. The order may be determined by real time stamps. In this case clock variations must be taken into account. The system may synchronize clocks on each transaction or as part of a regular procure maintenance transactions. Order may also be determined by transaction count. Accordingly, each action is submitted with a stamp showing the transaction count on the locally maintained objections. The local count is incremented each time a transaction is created. Order may be determined by yet other means. For example, each action may contain state information describing the state of the managed object when the action was to occur. State information may be summarized as a state counter, or check sum, or as noted above, an action count.

Due to the possible simultaneity of events, the limitations of ordering mechanisms, and the use of buffering, differing actions may be inconsistent. This occurs if logically contradicting actions occur at the same time; where the same time is measured by time stamps within a margin (clock jitter, same transactions counts, or same initial state stamps, etc.). For example, if the symbiotically managed resource is a database, user A saw a numeric value of a field to be 6 and changed it to 7, and user B also saw the value of the field to be 6 but then changed it to 10, an inconsistent set of actions have occurred. Network delays and the use of queued actions may cause latencies between reading and modification of managed resource objects. The delays may be benign if there are no inconsistencies in the actions. However, for inconsistencies in actions which are not tolerable, there are a number of ways to cope with the inconsistencies should they arise:

1. resource locks
2. miscible actions
3. kick back for user resolution
4. assume consistent order if one exists
5. time warping
6. move forward Applying the first method to our example, that of resource locks, user A and user B would be blocked from editing the field until they had permission. In general if no one else is using the resource, permission would be granted. In our example, ownership would be denied due to the simultaneous request, or the two requests would be prioritized. In the case of denial, the user would initiate a retry sequence of some sort in order to get permission for writing. This would force access to be serialized and thus solve the problem. The knowledgeable reader will note that the science of managing such serialization of ownership is well known.

In the second approach, that of miscible actions, the actions are redesigned to describe desired modifications instead of simply supplying absolute values. Hence, in our example, instead of the action of user A being "write field with the value 17", the action would be defined as "add 1 to field", user B's action would be "add 4 to field". Hence in our example, the final value or the field would be 11, the net effect of both actions. Any set of actions which do not logically contradict are said to be miscible.

According to the third approach, the contradictory situation is presented to the users, and the users decide what to do. One user may be chosen as an administrator. The administrator would be responsible or fixing contradictions. In another case, the users who created the contradictions could agree on a change. As yet another possibility symbiotic partners may vote on the proper outcome. Further, one or more of the actions may simply be ignored.

In some situations a contradiction may be resolvable by looking at the logic of the operations. This is the fourth approach. In our example, if we knew that the record field was supposed to hold the maximum value, then we could just go with user B's modification, as user A's modification would have been overwritten if it had come first, or ignored if it had come second. As another example, if one user makes a managed resource read only, and then another user writes the same resource as an inconsistent action, then according to approach 4, the symbiotic manager will automatically resolve the inconsistency by assuming that the read only lock came second—as it does not make sense to modify read only file.

According to the fifth approach, actions are processed without having determined that no contradiction is possible; hence, it may be the case that actions arrive at a site out of order. I.e. it may be the case that later arriving actions may have a state counter or time stamp that indicates they should have been processed before taken actions. Then according to the approach of time warping, the taken transactions are reversed, to the point where the new arrival should have been processed, the new arrival is then processed, and then the old transactions are redone.

According to the sixth approach, when contradictory actions arrive at a site with the same state stamps, or time stamps within a jitter value, multiple versions of the managed resource are created. One version is created for each possible interpretation of the events, or for each set of mutually exclusive events. For example, if a document is being managed, and two actions arrive for changing the title, two versions of the document are created, one with each title. All versions become managed resources. At a latter time users may abandon versions they don't like by deleting them. This is called the method of move forward.

Figure 6A:
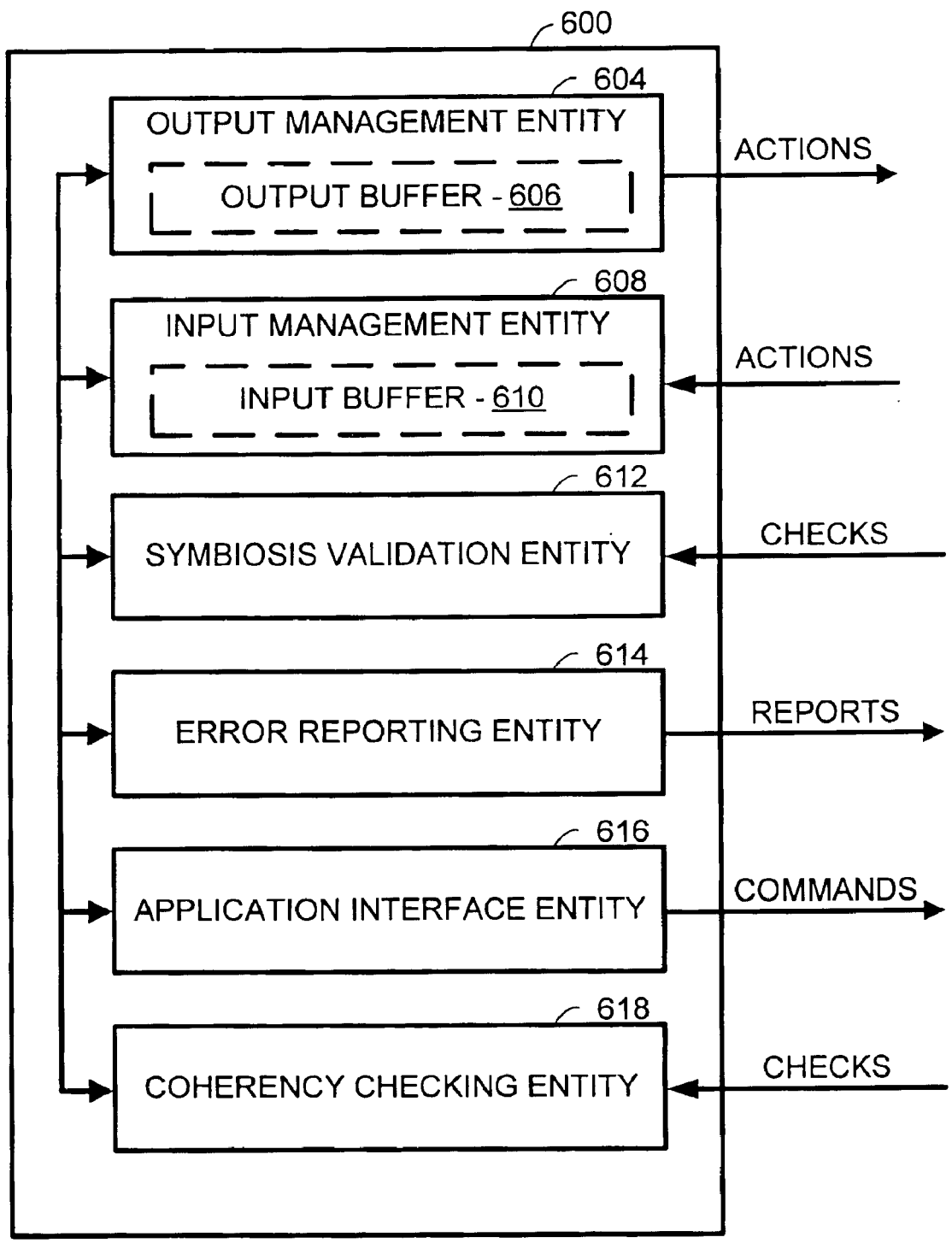
FIG. 6A is a block diagram functionally illustrating the components of a symbiotic computing entity operating upon a symbiotic partner according to the present invention.

FIG. 6A illustrates the components of a symbiotic computing entity 600 operating upon a symbiotic partner according to the present invention. The symbiotic computing entity 600 includes an output management entity 604, an input management entity 608, a symbiosis validation entity 612, an error reporting entity 614, an application interface entity 616 and a coherency checking entity. These components 604–618 communicatively couple to one another to pass data and control operations to one another.

The output management entity 604 includes an output buffer 606 and outputs actions to a network interface or such other components of a host system upon which the symbiotic computing entity 600 resides. The input management entity includes an input buffer 610 and receives actions from a user interface, script files or symbiotic partners via the network interface.

The symbiosis validation entity 612 receives the actions, pendant overhead information regarding managed resources and corresponding applications and determines whether commands may be generated that will maintain coherency of the managed resources. As was previously described, operating conditions may occur that prevent proper operation of the system so that coherency may not be maintained. If such is the case, the symbiosis validation entity 612 communicates with the error reporting entity 614 which generates an error report and may initiate recovery. However, if the symbiosis operation is possible, the symbiosis validation entity 612 operates in cooperation with the application interface entity which transmits corresponding commands to the respective application.

The coherency checking entity performs operations to determine whether managed resources are coherent. The coherency checking entity 618 receives checks which it uses to investigate the coherency of the managed resources. The checks may be checksums, cyclical redundancy checks and other input that may be used to check for coherency. Other checks that may be used include history files of actions that have previously been executed by the symbiotic partners upon a managed resource at its initial state. The coherency checking entity 618 may be invoked when an error has been detected, may be periodically invoked for each managed resource or may be manually invoked by a user or system administrator.

Figure 6B:
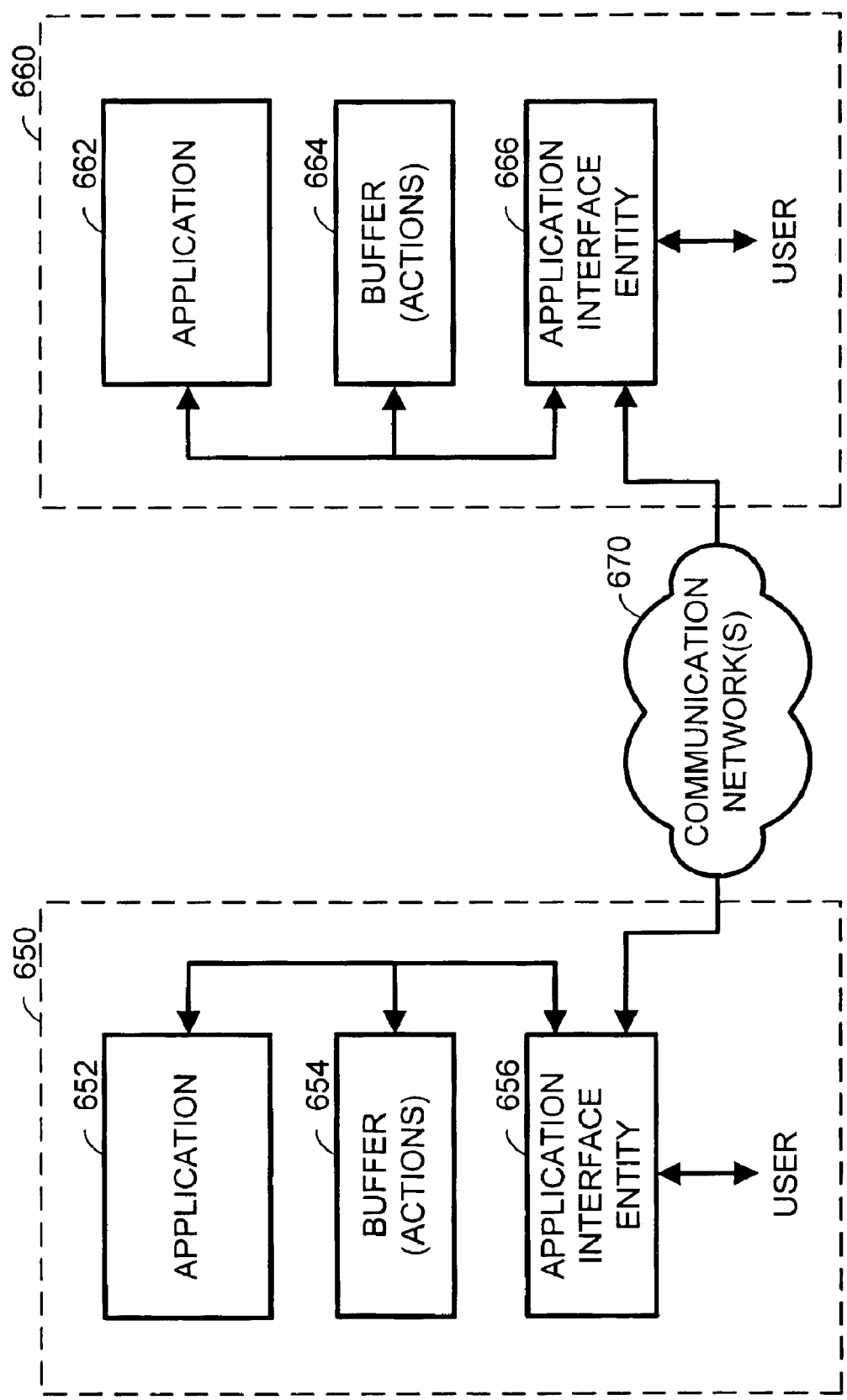
FIG. 6B is a block diagram functionally illustrating the interconnection of an application interface entity, a buffer which buffers actions and a managed resource (application) according to the present invention.

FIG. 6B is a block diagram functionally illustrating the interconnection of an application interface entity, a buffer which buffers actions and a managed resource (application) according to the present invention. According to the structure illustrated, two separate locations 650 and 660 are coupled by communication network(s) 670 and maintain applications, 652 and 662, respectively. The first location 650 includes an application 652 (managed resource) which may be a database, for example. The application 652 is coupled to a buffer 654 and an application interface entity 656. According to a particular operation of the application interface entity 656 of the present invention, all incoming actions (from local users or remote users at the second location 660) are buffered in the buffer 654 without affecting the contents of the application 652. These actions may then be reconciled with one another to ensure the coherency of the applications 652 and 662 prior to changing the application 652.

The second location 660 also includes an application 662, a buffer 664 which buffers actions and an application interface entity 666. In the second location 660 as well, all incoming actions (be they received from a local user or a remote user) are buffered in the buffer 664 before they alter the contents of the application 662. In the second location 660 as well the actions may be reconciled with one another so that coherency of the applications 652 and 662 may be maintained.

The structure of FIG. 6B as well as the buffering of actions performed provides substantial benefits in the data integrity of the applications 650 and 652. Because all actions are reconciled prior to enacting the actions, coherency is more robust. Further, because the application itself may be stored on a stable medium such as a CD ROM and the actions, which consume substantially less storage space, may be stored in a stable RAM memory, storage expenses are reduced and data integrity is substantial.

Upon accessing the application 652, the application interface entity 656 must consider the affect of the buffered actions 654 upon the access. For example, when the application 652 is a database, some of the buffered actions may affect the data being retrieved. Thus, even though the contents of the application 652 were not altered by the actions, the actions are considered as if they were. The buffered actions may be periodically enacted to alter the application 652. Such periodic updating of the application based upon the action 652 reduces processing requirements.

Figure 7:
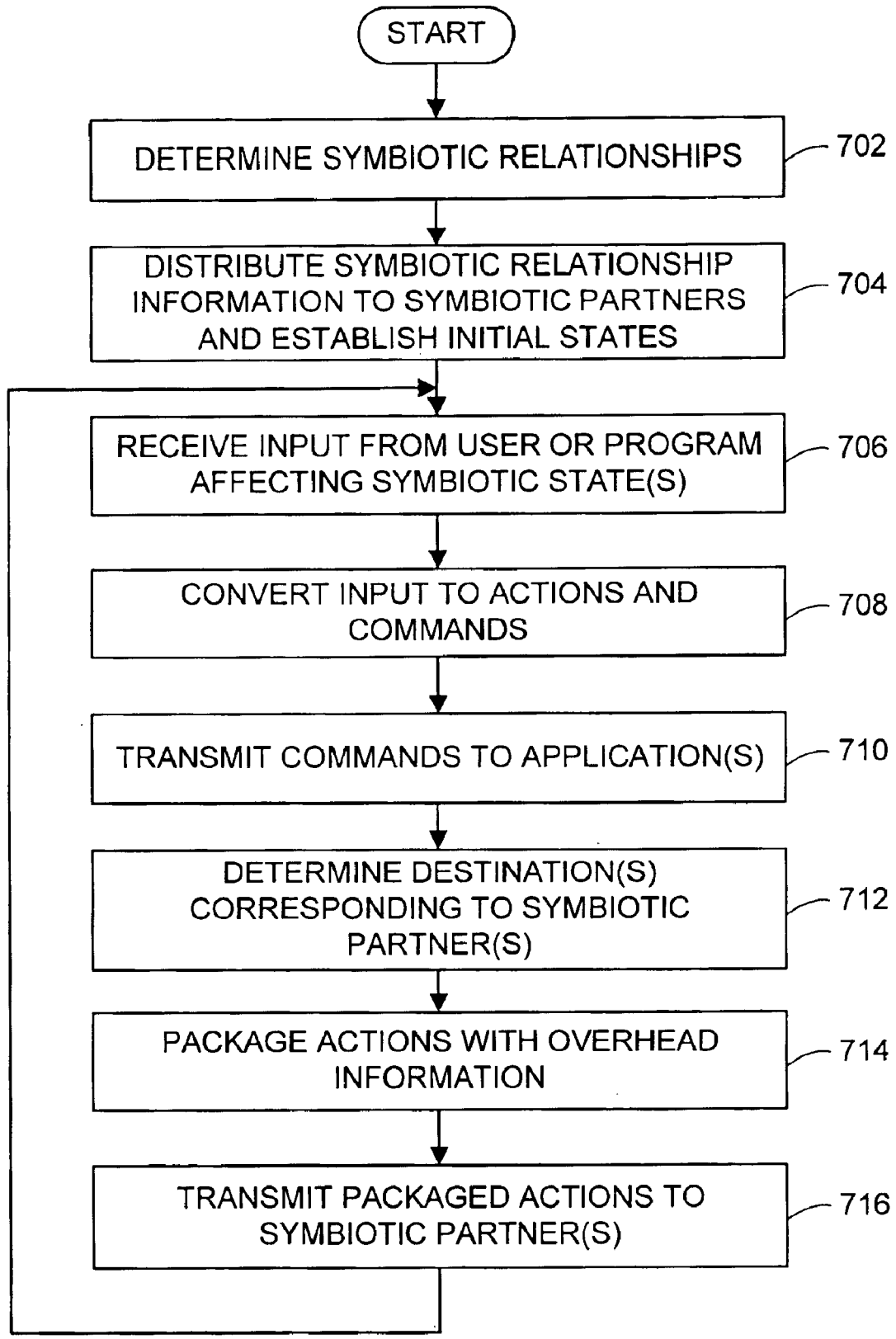
FIG. 7 is a logic diagram illustrating operation of a method according to the present invention in the generation of actions which affect a symbiotic relationship and the transmission of such actions from one symbiotic partner to at least one other symbiotic partner.

FIG. 7 illustrates operation according to the present invention in the generation of actions which affect a symbiotic relationship and the transmission of such actions to symbiotic partner(s). Operation commences at step 702 wherein the symbiotic relationships are determined. At step 702, managed resources and symbiotic relationships are determined. Such determinations are typically made by a system administrator. However, such determinations may be made, automatically, based upon user designations, or resource characteristics such as relative or absolute importance of resources, for example. Once the symbiotic relationships are determined, the resultant symbiotic relationship information that will be used to establish the symbiotic relationship(s) is distributed to symbiotic partner(s) at step 704. Also performed at step 704 is the establishment of initial states. Because operations according to the present invention are performed based upon the assumption of an initial coherent state of managed resources, step 704 includes establishing the initial state. In establishing the initial state, copies of managed resources may be passed among symbiotic partners. To maintain security, the resources passed may be encrypted or otherwise protected.

Next, at step 706, a symbiotic partner receives input from a user or program that affects the state of a managed resource. At step 708, this input is then converted to actions and commands. The commands are then passed to one or more applications at step 710, in some cases via an application program interface. Next, at step 712, the destination (s) of the actions is determined based upon the symbiotic partners. In minimal symbiosis, only a single destination will be determined. However, in full symbiosis among three or more symbiotic partners, multiple destinations exist. Once the destinations are determined, the actions are packaged with overhead information at step 714. Then, at step 716, the packaged actions are transmitted to the symbiotic partners. From step 716, operation continues to step 705 where additional user input is awaited.

Figure 8:
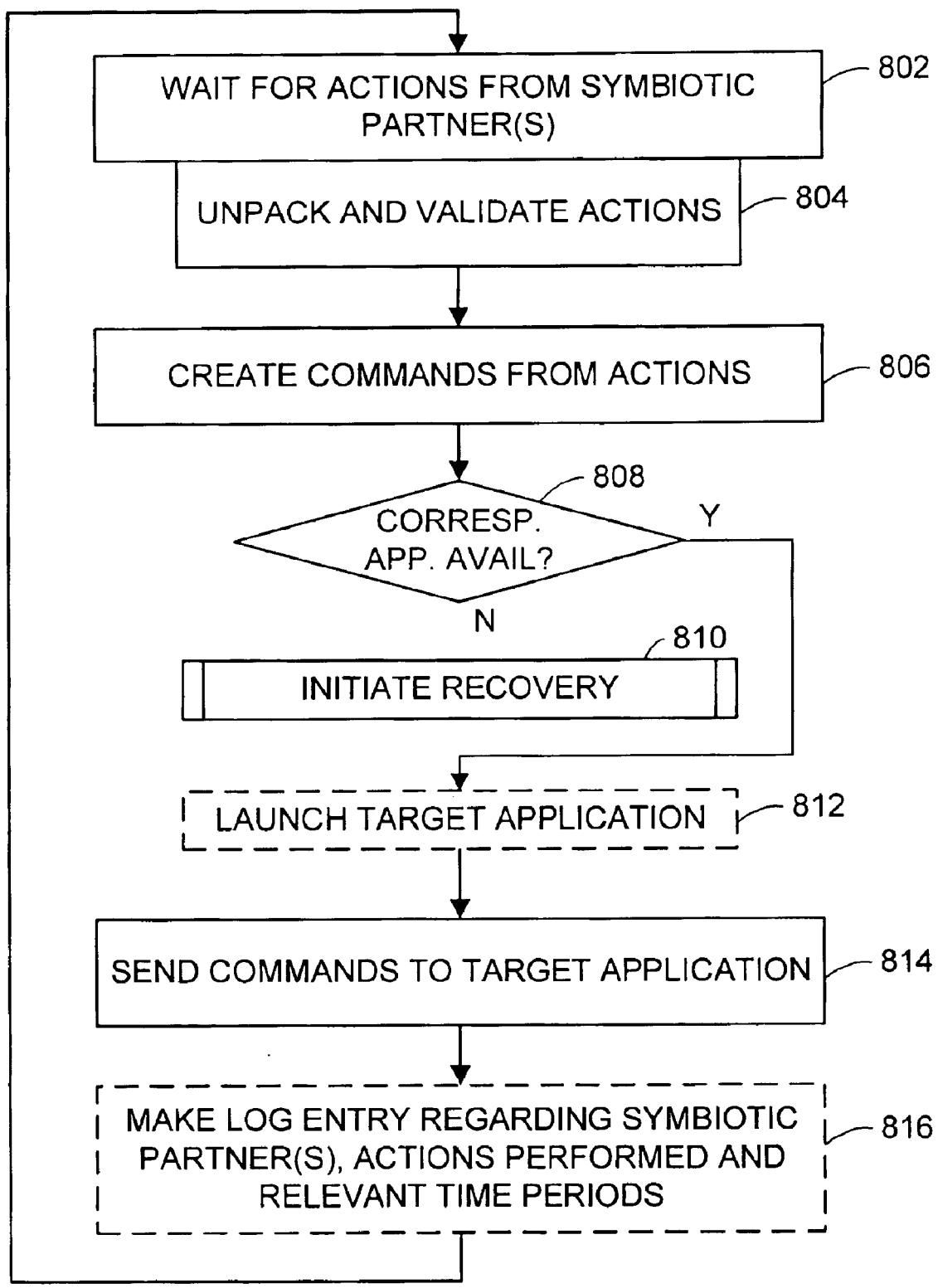
FIG. 8 is a logic diagram illustrating operation of a method according to the present invention in the receipt of actions from a symbiotic partner which affect a managed resource and usage of the actions to maintain coherency of the managed resource.

FIG. 8 illustrates operation of a method according to the present invention in the receipt of actions which affect the symbiotic relationship and usage of the actions to maintain coherency of managed resources. The operation of FIG. 8 is executed for each symbiotic partner that is a recipient of actions that were transmitted according to step 716 of FIG. 7.

First, at step 802, the symbiotic partner awaits actions from its symbiotic partners. When such actions are received at step 804, the actions are unpacked and validated. Then, at step 806, the unpacked and validated actions are used to create commands. Alternatively, the actions could be placed into a buffer for further reference, at which point operation would continue to step 802. Once the commands have been created, it is determined whether the corresponding application is available at step 808. If the corresponding application is not available at step 808, recovery is initiated at step 810. However, if the corresponding application is available at step 808, operation proceeds to step 812 wherein the corresponding target application is launched if it is not already running. Then, at step 814, the commands are sent to the corresponding target application. Finally, at optional step 816, a log entry is made for the actions affecting the symbiotic relationship and the managed resource. Appended to this log entry is additional information including a time stamp and a listing of the actions performed. This information may be used later for coherency checking and recovery. From step 816, operation returns to step 802.

Figure 9:
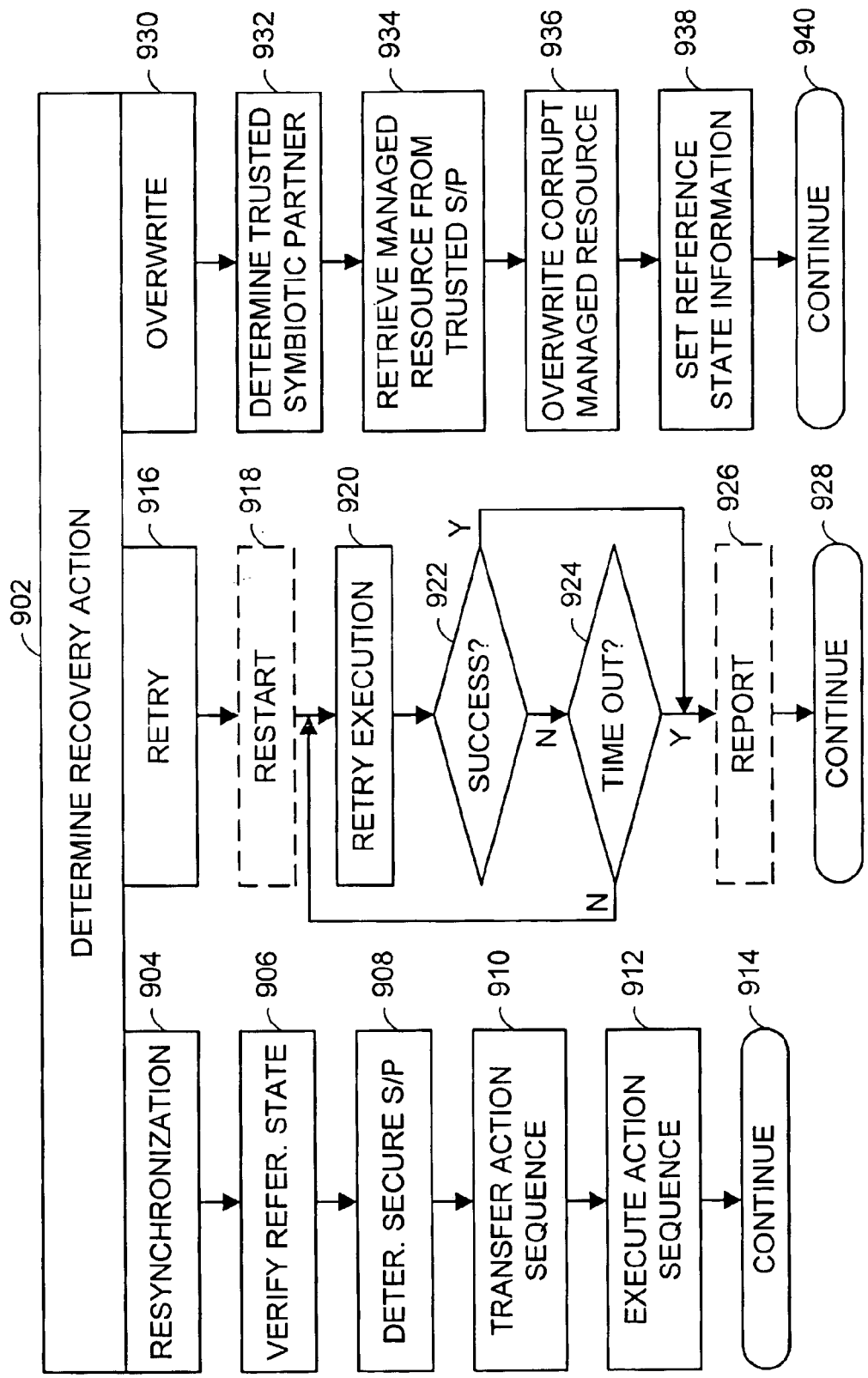
FIG. 9 is a logic diagram illustrating operation according to the present invention in recovering from a fault in operation.

FIG. 9 illustrates operation according to the present invention in recovering from a fault in operation. The fault in operation may have been determined at step 810 of FIG. 8. Alternatively, the fault in operation may have been determined, as was previously described with reference to FIG. 5A, when inconsistent actions are received by a symbiotic partner. Initially, at step 902, the recovery action to be employed is determined. If the fault relates to the unavailability of an application, for example, the system may simply attempt to retry the operations that resulted in the fault. However, if a more serious fault occurs, the system may determine that a resynchronization is required or that an overwrite of a managed resource is required.

Periodic coherency checking may result in recovery operations. For example, at selected points in time, operations may be performed on the managed resources of symbiotic partners to determine whether the managed resources are coherent. As will be described more fully with reference to FIG. 10, check sums, signatures and other coherency indicia may be employed to determine whether recovery is required.

If resynchronization is required, operation proceeds via step 904 to step 906 wherein a reference state verification is determined. As was previously discussed, all symbiotic operations assume a coherency at an initial state and at subsequent reference states, called "checkpoints" where coherency exists. Then, at step 908, of the symbiotic partners involved in the resynchronization, the system determines which symbiotic partners are trusted for purposes of the resynchronization. Then, a symbiotic partner selects a checkpoint. Then, a sequence of actions that have been performed since the last coherent state are transferred from at least one, or a combination of trusted symbiotic partners to each symbiotic partner requiring resynchronization at step 910. At step 912, each symbiotic partner requiring resynchronization executes the action sequence so that coherency will again be established. From step 912, operation proceeds to step 914 wherein normal operation continues.

However, if retry is selected at state 916, operation proceeds to step 918 wherein the particular problematic computer is optionally restarted. Then, at step 920, execution of the particular command(s) are retried. If the retried execution is not successful, as determined at step 922, operation proceeds to step 924 where it is determined if a time out has occurred. If not, operation returns to step 920. However, if the operation was successful at step 922 or a time out has occurred at step 924, operation proceeds to optional step 926 where the results are reported. From step 926, operation proceeds to step 928 wherein normal operation continues.

If overwriting of managed resources is required, operation proceeds via step 930 to step 932 wherein a trusted partner from the symbiotic partners is determined. Such selection may be based upon a predetermined identity, the relative appropriateness of the symbiotic partner over time or such other indication of which symbiotic partner is most stable. Once the determination is made at step 932, the managed resource is retrieved from the trusted symbiotic partner at step 934. Then, at step 936, the corrupt instance of the managed resource is overwritten. Next, at step 938, symbiotic state information is reset and operation continues at step 940.

Figure 10:
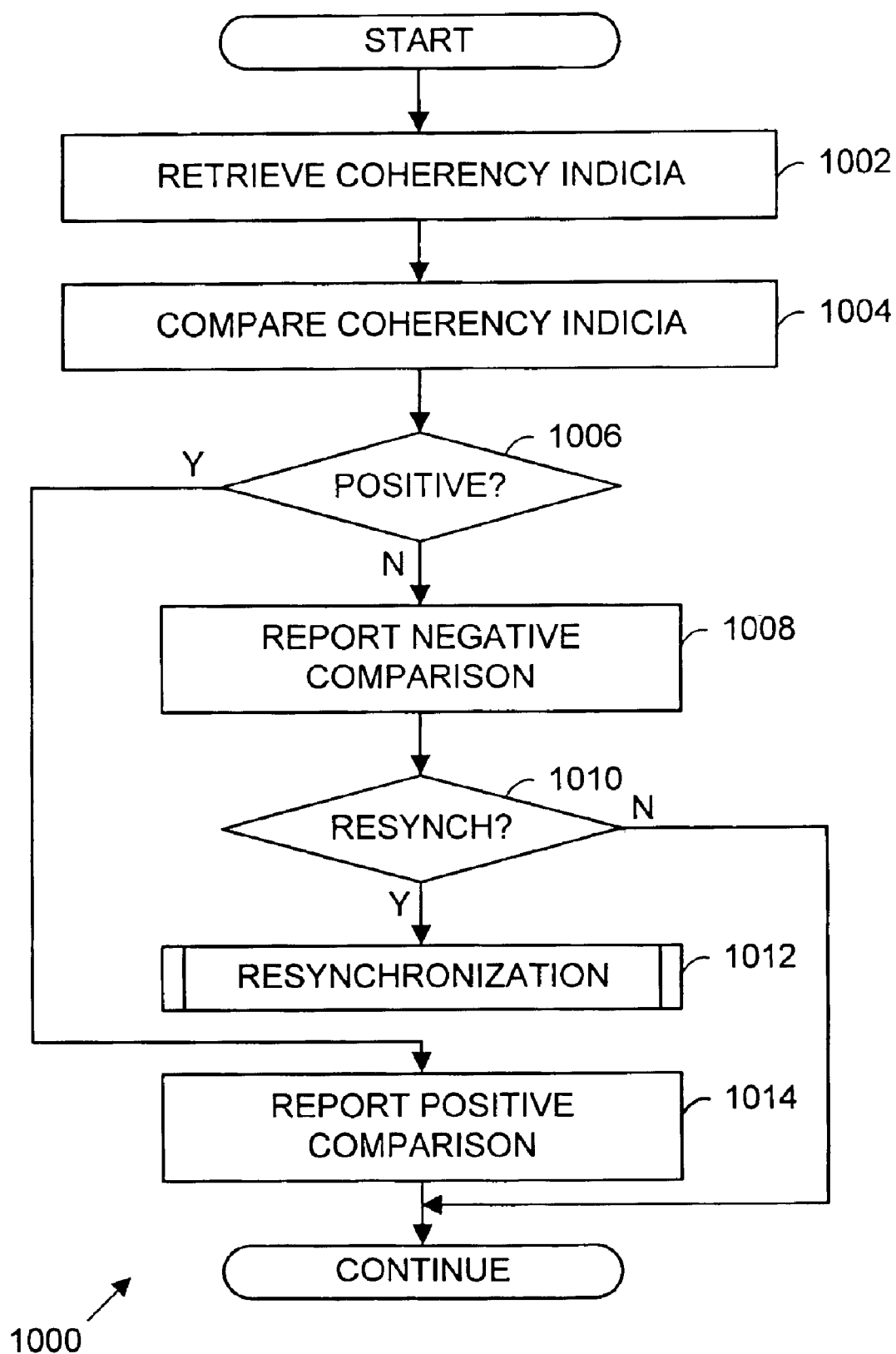
FIG. 10 is a logic diagram illustrating operation according to the present invention in determining whether coherency exists among managed resources between symbiotic partners.

FIG. 10 illustrates operation according to the present invention in determining whether coherency exists among managed resources between symbiotic partners. Operation commences at step 1002 wherein coherency indicia are retrieved for each instance of the managed resources. Coherency indicia may include, for example, check sums, CRCs and signatures and serve to characterize the coherency of the managed resources. Next, at step 1004, the coherency indicia are compared to determine whether coherency exists for the managed resource.

If the coherency indicia compare favorably, to indicate coherency of the managed resource, operation proceeds to step 1014 wherein the positive comparison is reported and normal operation continues. However, if the comparison is not favorable at step 1006, operation proceeds to step 1008 wherein the negative comparison is reported. Then, at step 1010, it is determined whether resynchronization is required. If so, resynchronization is performed at step 1012, such resynchronization corresponding to the steps starting with step 904 of FIG. 9. If resynchronization is not selected at step 1010, normal operation continues.

In view of the above detailed description of the present invention and associated drawings, other modifications and variations will now become apparent to those skilled in the art. It should also be apparent that such other modifications and variations may be effected without departing from the spirit and scope of the present invention as % et forth in the claims which follow.

What is claimed is:

1. A symbiotic computing system comprising:
   a plurality of symbiotic partners communicatively coupled with one another, each of the plurality of symbiotic partners having a respective instance of a managed resource that includes a data file;
   at least two symbiotic partners of the plurality of symbiotic partners receiving input from a local user affecting a respective instance of the managed resource;
   the at least two symbiotic partners producing respective actions based upon the input and storing the respective actions;
   each of the at least two symbiotic partners awaiting availability of communication paths to each other of the plurality of symbiotic partners;
   the each of the at least two symbiotic partners transmitting respective actions to the each other of the plurality of symbiotic partners;
   the each other of the plurality of symbiotic partners receiving the respective actions from the each of the at least two symbiotic partners;
   the each other of the plurality of symbiotic partners using all outstanding respective actions to execute operations upon respective instances of the managed resource so that all of the managed resources are affected in the same fashion, the operations including at least compilation, messaging, video editing, and display; and
   wherein when the each other of the plurality of symbiotic partners have used all outstanding respective actions to operate their respective instances of the managed resources, all instances of the managed resource are identical.

2. The symbiotic computing system of claim 1, wherein:
   the managed resource comprises a data entity;
   each of the symbiotic partners retains a respective instance of the data entity; and
   alterations made to an instance of the data entity are made to each other instance of the data entity to maintain coherency.

3. The symbiotic computing system of claim 2, wherein alterations made to any instance of the data entity are made to each other instance of the data entity to maintain coherency when communication paths from the each of the at least two symbiotic partners to each other of the plurality of symbiotic partners are available and the respective actions are transmitted.

4. The symbiotic computing system of claim 3, wherein alterations made to any instance of the data entity are made to each other instance of the data entity to maintain coherency.

5. The symbiotic computing system of claim 2, wherein the data entity is selected from the group consisting of data files, data bases, configuration files and source files.

6. The symbiotic computing system of claim 1, wherein:
   the managed resource comprises a video image;
   each of the symbiotic partners maintains and displays an instance of the video image; and alterations made to one instance of the video image are made to each other instance of the video image to maintain coherency.

7. The symbiotic computing system of claim 1, wherein each instance of the managed resource is affected by the actions via an application program.

8. The symbiotic computing system of claim 1, wherein the symbiotic computing system resides within a client/server environment.

9. The symbiotic computing system of claim 8, wherein one of the symbiotic partners resides upon a server computer and one of the symbiotic partners resides upon a client computer.

10. The symbiotic computing system of claim 1, wherein the symbiotic computing system resides within an object oriented environment.

11. The symbiotic computing system of claim 10, wherein:
    the managed resource includes an object;
    a respective instance of the object resides on each of the symbiotic partners; and
    coherency is maintained between the instances of the object.

12. The symbiotic computing system of claim 11, wherein the objects include data objects.

13. The symbiotic computing system of claim 1, wherein at least some of the symbiotic partners operate symmetrically.

14. The symbiotic computing system of claim 1, wherein at least some of the symbiotic partners operate asymmetrically.

15. The symbiotic computing system of claim 1, wherein actions are buffered by at least one of the symbiotic partners.

16. The symbiotic computing system of claim 1, wherein actions affecting the managed resource are investigated to determine whether they are consistent.

17. The symbiotic computing system of claim 16, wherein upon determining that actions are inconsistent, some of the inconsistent actions are rejected.

18. The symbiotic computing system of claim 16, wherein actions are ordered in an attempt to determine whether they are inconsistent.

19. The symbiotic computing system of claim 16, wherein when it is determined that actions are inconsistent, multiple copies of the managed resource are created.

* * * * *